US010519280B2

(12) United States Patent
Knott et al.

(10) Patent No.: US 10,519,280 B2
(45) Date of Patent: *Dec. 31, 2019

(54) PROCESS FOR PREPARING SIC-BONDED POLYETHERSILOXANES

(71) Applicant: Evonik Degussa GmbH, Essen (DE)

(72) Inventors: Wilfried Knott, Essen (DE); Dagmar Windbiel, Essen (DE)

(73) Assignee: Evonik Degussa GmbH, Essen (DE)

( * ) Notice: Subject to any disclaimer, the term of this patent is extended or adjusted under 35 U.S.C. 154(b) by 73 days.

This patent is subject to a terminal disclaimer.

(21) Appl. No.: 15/978,828

(22) Filed: May 14, 2018

(65) Prior Publication Data

US 2018/0355114 A1   Dec. 13, 2018

(30) Foreign Application Priority Data

Jun. 13, 2017 (EP) .................................... 17175693

(51) Int. Cl.
*C08G 77/08* (2006.01)
*C08G 77/46* (2006.01)
*C08G 77/38* (2006.01)
*C08L 71/00* (2006.01)
*C08G 77/06* (2006.01)
*C08G 77/00* (2006.01)
*C08G 77/12* (2006.01)

(52) U.S. Cl.
CPC ............ *C08G 77/46* (2013.01); *C08G 77/06* (2013.01); *C08G 77/38* (2013.01); *C08L 71/00* (2013.01); *C08G 77/12* (2013.01); *C08G 77/70* (2013.01)

(58) Field of Classification Search
USPC ...................................................... 528/15, 31
See application file for complete search history.

(56) References Cited

U.S. PATENT DOCUMENTS

| 4,847,398 | A | * | 7/1989 | Mehta | C08G 77/46 |
| | | | | | 556/445 |
| 4,857,583 | A | * | 8/1989 | Austin | C08G 77/46 |
| | | | | | 524/761 |
| 5,093,101 | A | | 3/1992 | Klein et al. | |
| 5,153,293 | A | * | 10/1992 | Hales | C08G 77/46 |
| | | | | | 524/773 |
| 5,198,207 | A | | 3/1993 | Klein et al. | |
| 5,221,499 | A | | 6/1993 | Klein et al. | |
| 5,371,161 | A | | 6/1994 | Knott et al. | |
| 5,430,097 | A | * | 7/1995 | Petroff | C08G 77/46 |
| | | | | | 524/755 |
| 5,430,166 | A | | 7/1995 | Klein et al. | |
| 5,430,167 | A | | 7/1995 | Klein et al. | |
| 5,455,367 | A | | 10/1995 | Klein et al. | |
| 5,475,127 | A | | 12/1995 | Klein et al. | |
| 5,565,183 | A | | 10/1996 | Knott et al. | |
| 5,648,444 | A | * | 7/1997 | Austin | C08G 77/46 |
| | | | | | 528/15 |
| 5,668,212 | A | | 9/1997 | Naito | |
| 5,670,129 | A | | 9/1997 | Klapdor et al. | |
| 5,831,103 | A | | 11/1998 | Klein et al. | |
| 5,856,548 | A | | 1/1999 | Dröse et al. | |
| 5,934,579 | A | | 8/1999 | Hiersche et al. | |
| 5,951,739 | A | | 9/1999 | Klapdor et al. | |
| 5,972,285 | A | | 10/1999 | Knott | |
| 5,981,812 | A | | 11/1999 | Eufinger et al. | |
| 6,071,977 | A | * | 6/2000 | Austin | C08G 77/38 |
| | | | | | 521/112 |
| 6,197,089 | B1 | | 3/2001 | Frommeyer et al. | |
| 6,255,511 | B1 | | 7/2001 | Klein et al. | |
| 6,265,456 | B1 | * | 7/2001 | Austin | C08G 77/38 |
| | | | | | 521/112 |
| 6,291,622 | B1 | * | 9/2001 | Drose | C08G 77/38 |
| | | | | | 526/64 |
| 6,307,082 | B1 | | 10/2001 | Klein et al. | |
| 6,372,874 | B1 | * | 4/2002 | Cameron | C08G 77/46 |
| | | | | | 528/15 |
| 6,387,154 | B1 | | 5/2002 | Frommeyer et al. | |
| 6,444,007 | B1 | | 9/2002 | Knott et al. | |
| 6,489,498 | B2 | | 12/2002 | Klein et al. | |
| 6,521,771 | B2 | | 2/2003 | Frommeyer et al. | |
| 6,659,162 | B2 | | 12/2003 | Frommeyer et al. | |
| 6,854,506 | B2 | | 2/2005 | Knott et al. | |
| 6,858,663 | B2 | | 2/2005 | Knott et al. | |
| 6,874,562 | B2 | | 4/2005 | Knott et al. | |
| 6,915,834 | B2 | | 7/2005 | Knott et al. | |
| 6,942,716 | B2 | | 9/2005 | Knott et al. | |
| 7,018,458 | B2 | | 3/2006 | Knott et al. | |
| 7,125,185 | B2 | | 10/2006 | Dudzik et al. | |
| 7,157,541 | B2 | | 1/2007 | Knott et al. | |
| 7,196,153 | B2 | | 3/2007 | Burkhart et al. | |
| 7,598,334 | B2 | | 10/2009 | Ferenz et al. | |
| 7,612,158 | B2 | | 11/2009 | Burkhart et al. | |
| 7,612,159 | B2 | | 11/2009 | Burkhart et al. | |
| 7,619,035 | B2 | | 11/2009 | Knott et al. | |
| 7,645,848 | B2 | | 1/2010 | Knott et al. | |
| 7,754,778 | B2 | | 7/2010 | Knott et al. | |
| 7,825,205 | B2 | | 11/2010 | Knott et al. | |

(Continued)

FOREIGN PATENT DOCUMENTS

EP    0314903 A2    5/1989
EP    0514737       11/1992

(Continued)

OTHER PUBLICATIONS

European Search Report dated Nov. 30, 2017.

*Primary Examiner* — Margaret G Moore
(74) *Attorney, Agent, or Firm* — Philip P. McCann; Nexsen Pruet PLLC

(57) ABSTRACT

A process for preparing SiC-bonded polyethersiloxanes by precious metal-catalysed addition of olefinically unsaturated polyethers onto siloxanes having SiH groups is described, in which, prior to commencement of reaction, the siloxane having SiH groups is mixed together with a polyethersiloxane, preferably by stirring, and then, in a second step, this preliminary mixture is contacted with an olefinically unsaturated polyether and with a precious metal catalyst and optionally further additives, preferably with further stirring, and the SiC bond formation reaction is conducted up to an SiH conversion, determined by gas-volumetric means, of at least 97%.

20 Claims, 1 Drawing Sheet

(56) References Cited

U.S. PATENT DOCUMENTS

| | | |
|---|---|---|
| 7,825,206 B2 | 11/2010 | Neumann et al. |
| 7,825,209 B2 | 11/2010 | Knott et al. |
| 8,138,294 B2 | 3/2012 | Henning et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,609,798 B2 | 12/2013 | Knott et al. |
| 8,623,984 B2 | 1/2014 | Henning et al. |
| 8,722,834 B2 | 5/2014 | Knott et al. |
| 8,722,836 B2 | 5/2014 | Knott et al. |
| 8,729,207 B2 | 5/2014 | Hartung et al. |
| 8,772,423 B2 | 7/2014 | de Gans et al. |
| 8,779,079 B2 | 7/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,068,044 B2 | 6/2015 | Schubert et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,441,145 B2 | 9/2016 | Schubert et al. |
| 9,481,695 B2 | 11/2016 | Knott et al. |
| 9,695,202 B2 | 7/2017 | Henning et al. |
| 9,783,635 B2 | 10/2017 | Schubert et al. |
| 9,896,541 B2 | 2/2018 | Fiedel et al. |
| 2002/0161158 A1 | 10/2002 | Burkhart et al. |
| 2007/0128143 A1 | 6/2007 | Knott et al. |
| 2009/0137752 A1 | 5/2009 | Knott et al. |
| 2010/0022435 A1 | 1/2010 | Knott et al. |
| 2010/0081781 A1 | 4/2010 | Schubert et al. |
| 2011/0230619 A1 | 9/2011 | Kuppert et al. |
| 2011/0301254 A1 | 12/2011 | Knott et al. |
| 2012/0068110 A1 | 3/2012 | Schubert et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0245304 A1 | 9/2013 | Schubert et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2016/0130290 A1 | 5/2016 | Knott et al. |
| 2016/0130402 A1 | 5/2016 | Schubert et al. |
| 2017/0081469 A1 | 3/2017 | Fiedel et al. |
| 2017/0198099 A1 | 7/2017 | Knott |
| 2017/0226285 A1 | 8/2017 | Lobert et al. |
| 2018/0016392 A1 | 1/2018 | Lobert et al. |

FOREIGN PATENT DOCUMENTS

| | | |
|---|---|---|
| EP | 0685425 | 12/1995 |
| EP | 0885932 A2 | 12/1998 |
| EP | 1350804 | 4/2004 |
| EP | 3202816 | 8/2017 |
| WO | 2002060621 | 8/2002 |
| WO | 2008132236 A2 | 11/2008 |
| WO | 2013010747 | 1/2013 |
| WO | 2017080747 | 5/2017 |
| WO | 2017080749 | 5/2017 |
| WO | 2017089068 | 6/2017 |
| WO | 2017174272 | 10/2017 |
| WO | 2018015152 | 1/2018 |

\* cited by examiner

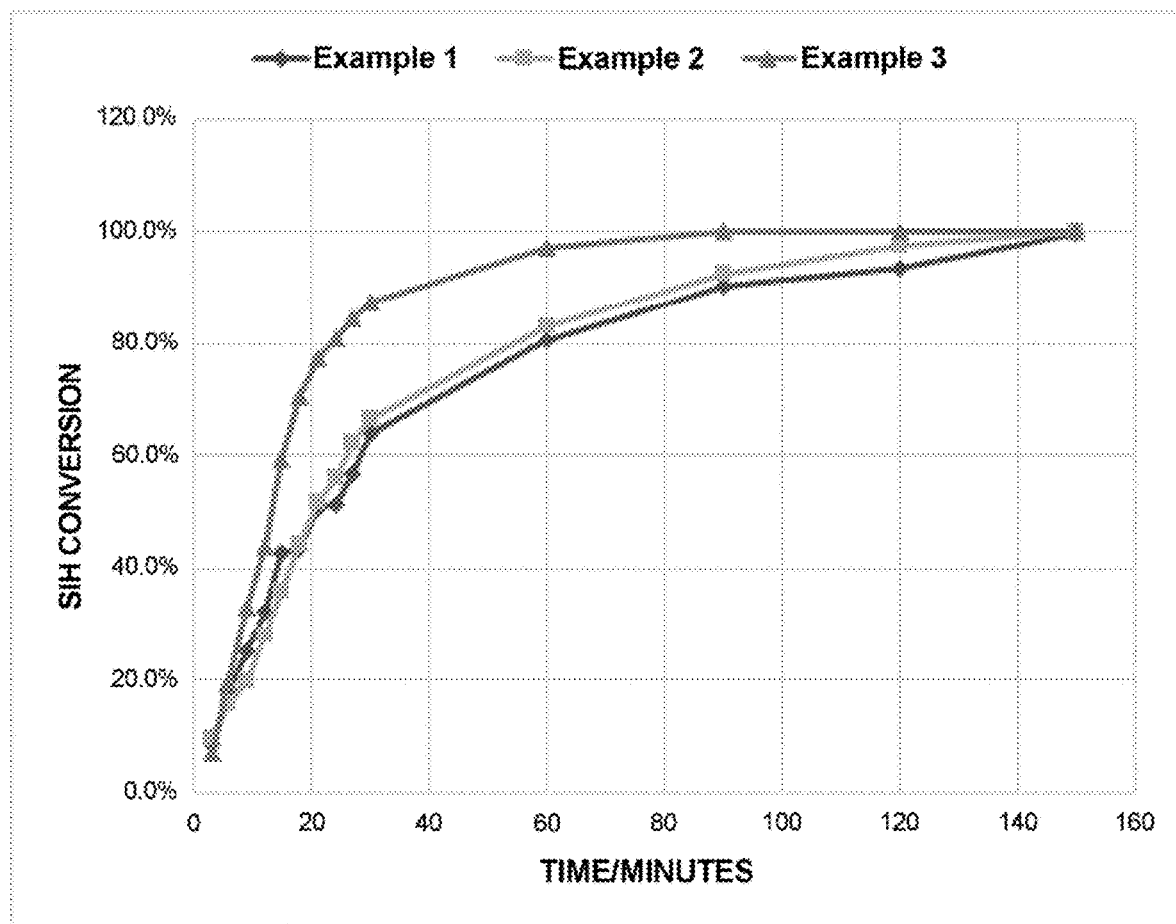

PROCESS FOR PREPARING SIC-BONDED POLYETHERSILOXANES

CROSS REFERENCE TO RELATED APPLICATIONS

This application claims the benefit of European Application No. 17175693.5 filed Jun. 13, 2017, and is incorporated herein by reference in its entirety.

FIELD

The invention is in the field of the organopolysiloxanes and relates to a process for preparing SiC-bonded polyethersiloxanes. More particularly, the invention relates to a process for preparing SiC-bonded polyethersiloxanes by a hydrosilylation reaction between a siloxane having SiH groups and an olefinically unsaturated polyether.

BACKGROUND

Preparation of organically modified organopolysiloxanes by a hydrosilylation reaction of a liquid organopolysiloxane having at least one silicon-hydrogen group per molecule with a non-silicone-containing, liquid organic compound containing at least one olefinic carbon-carbon double bond in each molecule is known.

SiC-bonded organomodified siloxanes, especially polyethersiloxanes, are an industrially very important substance class given their widely adjustable surfactant properties. The established route to preparation of these substances is the platinum metal-catalysed addition of siloxanes and silanes bearing SiH groups onto olefinically functionalized compounds, for example onto allyl polyethers.

The use of platinum catalysts for the addition of silanes or siloxanes having SiH groups onto compounds having one or more olefinic double bonds is known (hydrosilylation) and is described, for example, in the book "Silicon in Organic, Organometallic, and Polymer Chemistry" by Michael. A. Brook, publisher: John Wiley & Sons, Inc., New York 2000, page 403 ff., and in the patent literature, for example in DE-A-26 46 726, EP-A-0 075 703 and U.S. Pat. No. 3,775,452. In current industrial practice, predominantly hexachloroplatinic acid and cis-diammineplatinum(II) chloride have become established.

Even though it appears that this reaction principle is simple to describe in theory, reproducible performance on the industrial scale is very difficult.

Due to the phase incompatibility of the reactants (organopolysiloxane bearing SiH groups and organic compound containing an olefinic carbon-carbon double bond in each molecule), the hydrosilylation reactions conducted in a solvent-free manner commence from a biphasic state. This is especially true of the preparation of SiC-bonded polyethersiloxanes. Without introduction of considerable shear energy, the reaction mixtures without solvent typically have a tendency to separation of their reactant phases.

As a consequence of the observed incompatibility of the reactant phases, the hydrosilylation reactions conducted in a solvent-free manner often run very slowly, sometimes even incompletely, and hence impair the space-time yield achievable in the production and in some cases also reduce the product quality achievable.

The more hydrophilic the unsaturated polyether to be added on, the greater the phase incompatibility between the reactants. This finding is therefore especially applicable to polyethers having a high proportion of ethylene oxide in their molecular structure.

The application-related usability of products originating from the platinum metal-catalysed addition reaction of siloxanes bearing SiH groups onto compounds having olefinic double bonds is especially directly linked to the conversion achieved in the hydrosilylation, i.e. the minimization of residual SiH functions. Residual SiH, especially in the presence of ubiquitous traces of water (for example air humidity), leads to uncontrollable hydrolysis and crosslinking processes which, specifically in the case of addition compounds of high molecular weight, necessarily lead to gelation and make the products unusable.

SUMMARY

On the other hand, the use of solvents that create compatibilization of reactant phases, for example the use of the aromatic benzene, toluene or isomeric xylene solvents that are suitable for the hydrosilylation reaction, comes at the cost of a reduction, in some cases a considerable reduction, in the space-time yield, since some of the reactor volume is taken up by the auxiliary solvent. Moreover, it is necessary to completely remove the solvent by distillation after the reaction has ended.

DETAILED DESCRIPTION

In the context of a production operation producing specifically organomodified siloxanes, the organic auxiliary phase is always a troublesome extraneous phase that has to be removed in a complex manner, purified in a more or less complex manner and later recycled back into the overall process. Assurance of non-cross-contaminated streams of matter, in addition to aspects of safe storage, handling and disposal, is of particular significance here.

Accordingly, a fundamental technical challenge is that of finding a production process that can dispense with the use of solvents extraneous to the system.

US2004/198905 is concerned with this general problem of a hydrosilylation reaction commencing from the biphasic state and claims a solventless method for preparing organically modified organopolysiloxanes, comprising a hydrosilylation reaction in which a liquid organopolysiloxane (A) that contains at least one silicon-bonded hydrogen atom in each molecule is reacted with a non-silicone liquid organic compound (B) that contains at least one olefinic carbon-carbon double bond in each molecule in the presence of a hydrosilylation reaction catalyst (C), where the hydrosilylation reaction is carried out in a dispersion in which component (B) in component (A) or component (A) in component (B) are each in a microparticulate form of average particle size 100 µm induced by high-shear agitation of components (A) and (B).

The teaching of US2004/198905 requires that components (A) and (B) be subjected to high-energy shear in order to ensure that the respective dispersions of the reactant components ((B) dispersed in (A) or else (A) dispersed in (B)) are permeated solely by finely divided droplets having average particle sizes of ≤100 µm. According to US2004/198905, the performance of the hydrosilylation reactions depends directly on the achievement of this droplet geometry.

Preferred apparatuses mentioned therein for generation of the high-energy shear and the dispersion effect desired are colloid mills, homomixers and inline mixers. In the working examples, an ULTRA-TURRAX and a rotating disc mixer are used.

It is specifically this apparatus complexity that discredits the hydrosilylation process of US2004/198905. The high-energy dispersing machines addressed are costly to procure and to operate and, because of their wear, are also costly to maintain. Furthermore, they cannot be directly integrated into existing operating plants that are usually equipped with standard stirrers.

In production areas where there is an explosion risk, for example in facilities for preparation of organomodified organopolysiloxanes, considerable safety efforts are necessary in the installation of high-energy dispersing machines. By contrast with standard stirrers, these high-speed apparatuses always give rise to the risk of sparking generated by friction in the metallic parts thereof (rotor/stator).

A further handicap of the teaching disclosed in US2004/198905 lies in the use of unrealistically high use amounts of costly platinum catalyst. All the examples adduced therein resort to amounts of platinum of 80 ppm by weight (ppmw) based on the overall mixture. However, such overextravagant catalyses are of no practical relevance either with regard to costs or with regard to the quality deficits to which an organomodified polyorganosiloxane prepared in this way is subject in terms of discolouration, odour and viscosity. However, the document is silent about these important product properties.

In view of US2004/198905, the aim is to find an efficient process for preparing organically modified organopolysiloxanes by a hydrosilylation reaction that can dispense with the use of high-energy dispersing machines and disproportionately large amounts of platinum, and nevertheless assures a rapid SiC bond formation reaction and likewise enables solvent-free operation.

In the context of the present invention, a very efficient solvent-free process has now surprisingly been found for preparation of organically modified organopolysiloxanes by a hydrosilylation reaction between an organopolysiloxane having at least one silicon-hydrogen group per molecule and an olefinically unsaturated polyether.

The invention provides a process for preparing SiC-bonded polyethersiloxanes by precious metal-catalysed addition of olefinically unsaturated polyethers onto siloxanes having SiH groups, characterized in that
(i) prior to commencement of reaction, the siloxane having SiH groups is mixed together with a polyethersiloxane, preferably by stirring, and then
(ii) in a second step, this preliminary mixture is contacted with an olefinically unsaturated polyether and with a precious metal catalyst and optionally further additives, preferably with further stirring,
and the SiC bond formation reaction is conducted up to an SiH conversion, determined by gas-volumetric means, of at least 97%.

The siloxane having SiH groups which is to be used and the olefinically unsaturated polyether are preferably liquid at room temperature (20° C.).

FIG. 1 shows the conversion/time characteristics of the SiC bond formation reaction. Plotted on the ordinate is the SiH conversion determined by gas-volumetric means in percent, and on the abscissa the reaction time in minutes. The curved profile that characterizes the process according to the invention (Example 3) shows the process improvement associated with the process according to the invention. The curve profiles of noninventive examples 1 and 2 have a much lower slope in the exothermic initial phase; by contrast, the inventive example has a distinctly higher SiH conversion even after a short time.

In the context of the process according to the invention, it has been found that even the mixing of a small amount of a polyethersiloxane with the siloxane having SiH groups prior to the reaction is sufficient to bring about a very effective reaction acceleration of the desired SiC bond formation reaction.

The amount of polyethersiloxane to be added is preferably in the range from 2% to 10% by weight based on the total mass of the reactants, preferably in the range from 2% to 6% by weight. In general, some exploratory preliminary experiments will show the person skilled in the art what use amount is the most appropriate.

To achieve the reaction acceleration, it is possible in principle to use a multitude of polyethersiloxanes. Preferably, however, from the point of view of system compatibility and later use, preference is given here to using polyethersiloxanes having a chemical structure similar or close to that of the polyethersiloxane which is the target of the hydrosilylation reaction.

Thus, for dispersion of the siloxane having SiH groups, particular preference is given in accordance with the invention to choosing the polyethersiloxane corresponding structurally to that polyethersiloxane which originates from the SiC bond-forming addition of the olefinically unsaturated polyether onto the siloxane having SiH groups.

Here too, the process according to the invention departs from the teaching of US2004/198905, from which it is not possible to infer what dispersion of the reactant components ((B) dispersed in (A) or else (A) dispersed in (B)) permits a preferred reaction regime.

In this connection, the comparative experiment (Example 2) underlines the ineffectiveness of a procedure in which, in a first step, the non-silicone-containing liquid organic compound (polyether) is mixed together with a polyethersiloxane by stirring and then, in a second step, this preliminary mixture is contacted with a siloxane having SiH groups and with a precious metal catalyst by stirring. Compared to the process according to the invention conducted in the same system, there is a distinct delay in the space-time behaviour observed, which is essentially similar to the space-time behaviour of the one-pot system executed in noninventive example 1, in which the siloxane having SiH groups and polyether are heated to reaction temperature together while stirring and then contacted with the precious metal catalyst.

How effectively the process claimed in accordance with the invention proceeds even in hydrosilylations where the use amount of platinum has already been optimized close to a lower limiting concentration which is still just effective for economic reasons is demonstrated by Example 3.

The siloxanes having SiH groups that are used in the process according to the invention are preferably those that conform to one of the formulae (I) to (V):

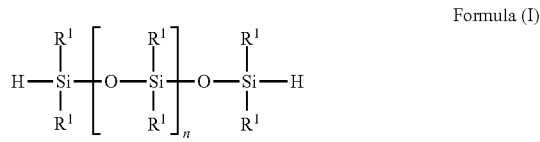

Formula (I)

with $R^1$, identically or differently: alkyl and/or aralkyl and/or aromatic radical, each comprising 1 to 10 carbon atoms, and with $1 \leq n \leq 250$,

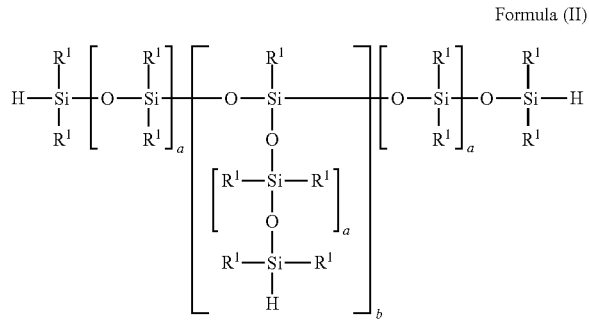

Formula (II)

with $R^1$, identically or differently: alkyl and/or aralkyl and/or aromatic radical, each comprising 1 to 10 carbon atoms
and with a, identically or differently: $1 \leq a \leq 60$ and with $0 < b \leq 10$,

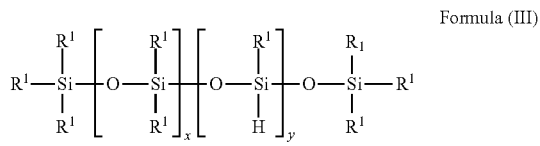

Formula (III)

with $R^1$, identically or differently: alkyl and/or aralkyl and/or aromatic radical, each comprising 1 to 10 carbon atoms
with $0 \leq x \leq 250$ and
with $1 \leq y \leq 50$,

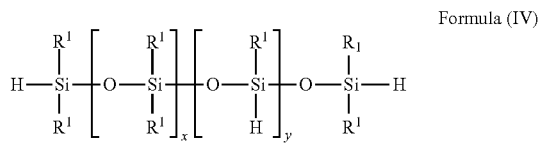

Formula (IV)

with $R^1$, identically or differently: alkyl and/or aralkyl and/or aromatic radical, each comprising 1 to 10 carbon atoms,
with $0 \leq x \leq 250$ and
$1 \leq y \leq 50$,

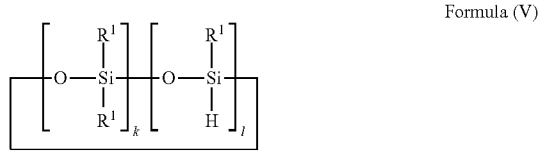

Formula (V)

with $R^1$, identically or differently: alkyl and/or aralkyl and/or aromatic radical, each comprising 1 to 10 carbon atoms,
and with $4 \leq (k+l) \leq 5$ and
Preferably, the $R^1$ radical shown in the formulae (I) to (V) is a methyl group.
Preferred olefinically unsaturated polyethers for performance of the process according to the invention are those that conform to the formula (VI):

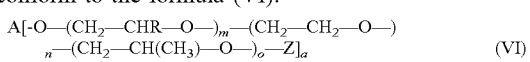
(VI)

in which
A is an olefinically unsaturated organic radical having at least two carbon atoms, preferably at least three carbon atoms, of an organic starter compound for provision of the polyether,
R is independently a saturated alkyl group having 2-18 carbon atoms or an aromatic radical, preferably an ethyl group or a phenyl radical respectively,
Z is either hydrogen,
a linear or branched, saturated or unsaturated hydrocarbyl radical having 1-18 carbon atoms, preferably a methyl, ethyl, propyl, butyl, vinyl, allyl or methallyl group, or
the radical of an organic acid of the formula $—C(=O)—Z_E$ where $Z_E$ is an organic radical, preferably a linear or branched, saturated or unsaturated hydrocarbyl radical having 1 to 17 carbon atoms, preferably a methyl group, or an aromatic hydrocarbyl radical having 6 to 20 carbon atoms, preferably a phenyl radical, or
the radical of the formula $—C(=O)—O—Z_C$ where $Z_C$ is an organic radical, preferably a linear or branched, saturated or unsaturated hydrocarbyl radical having 1 to 18 carbon atoms, preferably a methyl or ethyl group, or an aromatic hydrocarbyl radical having 6 to 20 carbon atoms, preferably a phenyl radical,
m is 0 up to 50, preferably 0 up to 30, more preferably 0 up to 20
n is 0 up to 250, preferably 3 up to 220, more preferably 5 up to 200
o is 0 up to 250, preferably 3 up to 220, more preferably 5 up to 200
a is 1 up to 8, preferably greater than 1 up to 6, more preferably 1, 2, 3 or 4,
with the proviso that the sum total of m, n and o is not less than 1.

The index values recited here and the value ranges of the indices specified may be understood to mean averages (weight averages) of the possible statistical distribution of the structures actually present and/or the mixtures thereof. This also applies to structural formulae exactly reproduced per se as such, for example to formula (VI).

The units labelled m, n, and o may either be statistically mixed or else may form a blockwise arrangement in the chain. Statistical distributions may have a blockwise structure with any number of blocks and any sequence or be subject to a randomized distribution; they may also have an alternating structure or else form a gradient along the chain; in particular, they can also form any mixed forms thereof in which groups of different distributions may follow one another. Specific embodiments can lead to restrictions to the statistical distributions as a result of the embodiment. There is no change in the statistical distribution for all regions unaffected by the restriction.

In the context of the present invention, the A radical is understood to mean radicals of substances that form the start of the olefinically unsaturated polyether or olefinically unsaturated alkoxylation product to be prepared, which is obtained by the addition of alkylene oxides. The starter compound is preferably selected from the group of olefinically unsaturated alcohols and polyetherols. Preferably, the starter compound containing the A group used is a monovalent olefinically unsaturated polyether alcohol and/or a monovalent olefinically unsaturated alcohol, or any desired mixtures thereof. If two or more starter compounds A have been used as a mixture, the index a may also be subject to a statistical distribution. Z may additionally also be the radical of a starter compound Z—OH.

Monomers used with preference in the alkoxylation reaction are ethylene oxide, propylene oxide, butylene oxide and/or styrene oxide and also any desired mixtures of these epoxides. The different monomers may be used in pure form or as a mixture. A further epoxide can also be metered continuously over time into an epoxide already present in the reaction mixture, so as to give rise to an increasing concentration gradient of the epoxide added continuously. The polyethers formed are thus subject to a statistical distribution in the end product, and restrictions can be determined via the metered addition. In this case of the continuous addition of a further epoxide to an epoxide already present in the reaction mixture, a structure gradient along the length of the chain is to be expected. The correlations between metered addition and product structure are known to those skilled in the art.

Particular preference is given to the polyethers of the formula (VI) having a weight-average molar mass of 76 to 10 000 g/mol, preferably of 100 to 8000 g/mol and more preferably of 200 to 6000 g/mol.

However, the A radicals are preferably those that have originated from compounds of the formula (II):

A[-OH]$a$                 (II)

where a is 1.

Starter compounds used for the alkoxylation reaction may preferably be any compounds of the formula (II)

A[-OH]$a$                 (II)

The compounds of formula (II) have at least one hydroxyl group and A=olefinically unsaturated organic radical (as defined above). The olefinically unsaturated organic radical has at least two carbon atoms, preferably at least three carbon atoms. In the context of the present invention, starter compounds are understood to mean substances that form the beginning (start) of the polyether or alkoxylation product to be prepared, which is obtained by addition of alkylene oxides. The starter compound is preferably selected from the group of olefinically unsaturated alcohols or polyetherols. Preferably, the starter compound containing the A group used is a monovalent olefinically unsaturated polyether alcohol and/or a monovalent olefinically unsaturated alcohol, or any desired mixtures thereof.

Particular preference is given to the radicals that derive from allyl alcohol, 1-hexenol, methallyl alcohol, vinyl alcohol and vinyloxybutanol.

In the context of this invention, the term "polyether" encompasses a wide range of compounds, not just polyethers, polyetherols, polyether alcohols and polyether esters, but also polyethercarbonates, which may be used synonymously with one another. At the same time, the term "poly" does not necessarily have to mean that there are a multiplicity of ether functionalities or alcohol functionalities in the molecule or polymer. Instead, this merely suggests the presence at least of repeat units of individual monomer units or else compositions that have a relatively high molar mass and additionally a certain polydispersity. In connection with this invention, the word fragment "poly" encompasses not only exclusively compounds with at least 3 repeat units of one or more monomers in the molecule, but especially also those compositions of compounds which have a molecular weight distribution and at the same time have an average molecular weight of at least 200 g/mol. This definition takes account of the fact that it is customary in the field of industry in question to refer to such compounds as polymers even if they do not appear to conform to a polymer definition as per OECD or REACH guidelines.

In the context of the teaching of the invention, the unsaturated polyethers to be used are preferably ethylene oxide derivatives and propylene oxide derivatives of the unsaturated alcohols mentioned and include not only the homopolymer structures derived from ethylene oxide (EO) only or propylene oxide (PO) only but also all mixed EO/PO derivatives obtainable.

Preference is given to using low molecular weight polyetherols having a hydroxyl group and weight-average molar masses of 100 to 5000 g/mol as starter compounds. Particularly suitable are polypropylene glycols, polyethylene glycols, poly(ethylene)-co-(propylene) glycols, polybutylene glycols, poly(propylene)-co-(butylene) glycols, poly(butylene)-co-(ethylene) glycols, having an OH group. Among these polyalkylene glycols, advantageous compounds are especially those that derive from allyl alcohol, 1-hexenol, methallyl alcohol, vinyl alcohol and vinyloxybutanol.

The contents of the book "Chemie and Technologie der Silicone" [Chemistry and Technology of the Silicones], Verlag Chemie, 1960, of DE-B-26 46 726, of EP-A-0 075 703, of WO 98/00463, of U.S. Pat. No. 3,516,946, of U.S. Pat. No. 3,814,730, of U.S. Pat. No. 3,775,452, of U.S. Pat. No. 4,288,345, of EP-A-1 520 870 are hereby incorporated by reference and are considered to form part of the disclosure-content of the present invention.

According to the invention, the hydrosilylation is conducted in the presence of a precious metal catalyst. It is possible here to use, for example, catalysts such as platinum complexes, rhodium complexes, osmium complexes, ruthenium complexes, palladium complexes, iridium complexes or similar compounds or the corresponding pure elements or derivatives thereof immobilized on silica, alumina or activated carbon or similar support materials. The hydrosilylation is preferably conducted with the aid of platinum complexes such as cis-$(NH_3)_2PtCl_2$ (cis-platin), di-□-[chlorobischloro(cyclohexene)platinum(II)] or preferably with complexes of zero-valent platinum, for example [tris(divinyltetramethyldisiloxane)bisplatinum(0)] (Karstedt's catalyst) and more preferably with solutions of olefin-activated platinum(0) complex catalysts (called WK catalysts) according to the teaching of EP1520870. The amount of catalyst here is such that the total concentration of platinum is 1 to 100 ppmw (ppm by weight), preferably 2 to 10 ppmw, based on the overall reaction mixture.

As will be apparent to those skilled in the art, the minimum platinum concentration is preferably chosen such that it permits a reliably rapid SiC bond-forming reaction, without impairing the economic viability of the process by excessively high precious metal use or else, furthermore, causing disadvantageous product discolouration.

The hydrosilylation can be conducted at temperatures between 0 and 200° C., preferably between 50 and 140° C.

The catalysts can be used over a wide temperature range. For avoidance of side reactions, the temperature range is preferably chosen at such a low level that it constitutes an acceptable compromise between the desired product purity and production performance. The olefin-activated systems that are preferred in accordance with the invention give satisfactory catalysis with weak exothermicity even from 50° C. For achievement of higher throughput rates, the conversion temperature can also be considerably increased without resulting in deactivation and shutdown phenomena.

Suitable processes for hydrosilylation are described, for example, in the book "Chemie and Technologie der Silicone", Verlag Chemie, 1960, page 43, and in U.S. Pat. No. 3,775,452 and EP-A-1 520 870, to which reference is made explicitly.

More particularly, the process according to the invention avoids the use of high-energy dispersing machines such as, in particular, colloid mills, homomixers, inline mixers or rotary disc-equipped rotary disc mixers. More particularly, the process according to the invention is conducted in the absence of organic solvents, i.e. more particularly in the absence of solvents such as alcohols, for example ethyl alcohol and isopropyl alcohol, and aromatic solvents, for example benzene, toluene and xylene. "Absence of organic solvents" in the context of the present invention means that less than 5% by weight, based on the total mass of the reactants, preferably less than 2% by weight, further preferably less than 1% by weight and especially no organic solvents at all are used. The input of organic solvents is unnecessary for the process according to the invention, but may arise in the introduction of the catalyst, for example when solutions of olefin-activated platinum(0) complex catalysts are used.

According to the invention, if desired in the individual system, the olefinically unsaturated polyether can be added with a precious metal catalyst and optionally further additives. These additives, for example in the case of use of olefinically unsaturated polyethers bearing a terminal hydroxyl group, can serve to prevent unintended increase in molar mass in the hydrosilylation as a result of dehydrocondensation or acetal formation, and are described inter alia in U.S. Pat. No. 4,847,398 (alkali metal carboxylates) or, for example, in EP 0 550 064 (sterically hindered amines and phosphines).

The process claimed in accordance with the invention is suitable for production of SiC-bonded polyethersiloxanes that can be used as stabilizers for PUR foams, defoamers, paint additives, emulsifiers, especially cosmetic emulsifiers, cosmetic conditioners, deaerators, demulsifiers, textile modifiers, building protection additives, plastics additives, especially anti-scratch additives, anti-fouling additives or coatings and anti-icing agents.

The present invention further provides SiC-bonded polyethersiloxanes that result from the process according to the invention and for their aforementioned use.

EXAMPLES

Without restricting the teaching of the invention, examples which follow serve to elucidate the process claimed to the person skilled in the art.

Gas-volumetric determination of the SiH conversion:

The SiH conversion achieved at a particular juncture of the reaction is determined by gas-volumetric means by the sodium butoxide-induced breakdown of a weighed sample taken from the reaction matrix in a gas burette. The volume of the hydrogen released indicates the reaction progress achieved. For detailed description of the methodology of the gas-volumetric SiH determination, see C. Harzdorf, Z. Anal. Chem. 276, 279-283 (1975).

Example 1 (Noninventive)

A 250 ml three-neck flask provided with a contact thermometer, precision glass stirrer and reflux condenser is initially charged with 30.8 g (75 mmol) of a poly(methylhydro)polydimethylsiloxane having an SiH value, determined by gas-volumetric means, of 2.44 eq/kg, together with 87.4 g (101.5 mmol) of an allyl alcohol-started, ethylene oxide/propylene oxide-based polyether (propylene oxide content 26% by weight) having an iodine number of 30.5 g/100 g, and heated to 70° C. by means of a heating mantle while stirring (400 rpm) within 7 minutes. The reaction is started by addition of 5 ppmw of platinum in the form of an ethylene-activated Karstedt catalyst according to EP 1 520 870 B1, dissolved in decamethylcyclopentasiloxane. To check the conversion of the exothermic reaction that sets in, samples are taken every 3 minutes in the first 30 minutes and weighed in a breakdown flask. The respective SiH conversion is then determined by volumetric means by sodium butoxide-induced breakdown of the weighed samples in the gas burette. The maximum exothermicity has been attained at 90° C. after only 9 minutes. After one hour, the gas-volumetric determination shows an SiH conversion of 80.6% and, after 2.5 hours, an SiH conversion of 99.6%.

Example 2 (Noninventive)

A 250 ml three-neck flask provided with a contact thermometer, precision glass stirrer and reflux condenser is initially charged with 6.2 g (5 w % based on the overall mixture) of the polyethersiloxane prepared in Example 1, together with 87.4 g (101.5 mmol) of an allyl alcohol-started, ethylene oxide/propylene oxide-based polyether (propylene oxide content 26% by weight) having an iodine number of 30.5 g/100 g, and heated to 70° C. by means of a heating mantle while stirring (400 rpm) within 7 minutes. The reaction is started by the immediate addition of 30.8 g (75 mmol) of a poly(methylhydro)polydimethylsiloxane having an SiH value, determined by gas-volumetric means, of 2.44 eq/kg, together with 5 ppmw of platinum in the form of an ethylene-activated Karstedt catalyst according to EP 1 520 870 B1, dissolved in decamethylcyclopentasiloxane. To check the conversion of the exothermic reaction that sets in, samples are taken every 3 minutes in the first 30 minutes and weighed in a breakdown flask. The respective SiH conversion is then determined by volumetric means by sodium butoxide-induced breakdown of the weighed samples in the gas burette. To check the conversion, samples are taken every 3 minutes in the first 30 minutes and the SiH conversion is determined by gas-volumetric means. At 90° C., the maximum exothermicity has been attained after 9 minutes. After 1 hour, the gas-volumetric determination shows an SiH conversion of 83.1% and, after 2 hours, an SiH conversion of 97.9%.

Example 3 (Inventive)

A 250 ml three-neck flask provided with a contact thermometer, precision glass stirrer and reflux condenser is initially charged with 6.2 g (5 w % based on the overall mixture) of the polyethersiloxane prepared in Example 1, together with 30.8 g (75 mmol) of a poly(methylhydro)polydimethylsiloxane having an SiH value, determined by gas-volumetric means, of 2.44 eq/kg of hydrosiloxane, and heated to 70° C. by means of a heating mantle while stirring (400 rpm) within 7 minutes. The reaction is started by the immediate addition of 87.4 g (101.5 mmol) of an allyl alcohol-started, ethylene oxide/propylene oxide-based polyether (propylene oxide content 26% by weight) having a mean molar mass of 843 g/mol, together with 5 ppmw of platinum in the form of an ethylene-activated Karstedt catalyst according to EP 1 520 870 B1, dissolved in decamethylcyclopentasiloxane. To check the conversion of the exothermic reaction that sets in, samples are taken every 3 minutes in the first 30 minutes and weighed in a breakdown flask. The respective SiH conversion is then determined by volumetric means by sodium butoxide-induced breakdown of the weighed samples in the gas burette. To check the conversion, samples are taken every 3 minutes in the first 30 minutes and the SiH conversion is determined by gas-volumetric means. The maximum exothermicity is at 97° C. after 9 minutes of reaction time. After 1 hour, the gas-volumetric determination shows an SiH conversion of 97.1% and, after only 1.5 hours, the conversion is quantitative.

By sampling over the course of the reaction, conversion-time characteristics were determined for the 3 examples as shown in FIG. 1. Plotted on the ordinate is the SiH conversion determined by gas-volumetric means in percent, and on the abscissa the reaction time in minutes. The curved profile that characterizes the process according to the invention (Example 3) impressively shows the process improvement associated with the process. The curve profiles of noninventive examples 1 and 2 that are virtually identical within the scope of measurement tolerance have a distinctly lower slope in the exothermic initial phase than the curve for the process according to the invention. For example, the non-inventive reaction mixtures (Examples 1 and 2) reach about 50% of the theoretical SiH conversion after a reaction time of t=20 minutes, whereas the reaction mixture conducted in accordance with the invention (Example 3) already has 78% of the theoretical SiH conversion.

The curve that characterizes the process according to the invention also reaches the final conversion earlier, and hence demonstrates the productivity gain achieved.

The invention claimed is:

1. A process for preparing SiC-bonded polyethersiloxanes by precious metal-catalysed addition of olefinically unsaturated polyethers onto siloxanes having SiH groups, wherein
   (i) prior to commencement of reaction, the siloxane having SiH groups is mixed together with a polyethersiloxane, and then
   (ii) in a second step, this preliminary mixture is contacted with an olefinically unsaturated polyether and with a precious metal catalyst and optionally further additives, and the SiC bond formation reaction is conducted up to an SiH conversion, determined by gas-volumetric means, of at least 97%.

2. The process according to claim 1, wherein the polyethersiloxane to be mixed with the siloxane having SiH groups corresponds in structural terms to that polyethersiloxane that originates from the SiC bond-forming addition of the olefinically unsaturated polyether onto the siloxane having SiH groups.

3. The process according to claim 1, wherein the polyethersiloxane to be mixed with the siloxane having SiH groups is added in amounts of 5 to 100 percent by mass, based on the mass of the siloxane having SiH groups plus the mass of the olefinically unsaturated polyether.

4. The process according claim 1, wherein the at least one siloxane bearing SiH groups which is used for SiC bond formation conforms to one of the formulae (I) to (V):

Formula (I)

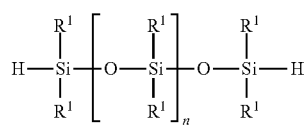

with $R^1$, identically or differently: alkyl and/or aralkyl and/or aromatic radical, each comprising 1 to 10 carbon atoms,
and with $1 \leq n \leq 250$, Formula (II)

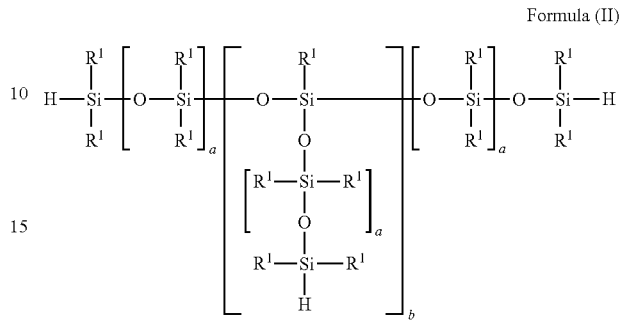

with $R^1$, identically or differently: alkyl and/or aralkyl and/or aromatic radical, each comprising 1 to 10 carbon atoms,
and with a, identically or differently: $1 \leq a \leq 60$ and with $0 < b \leq 10$, Formula (III)

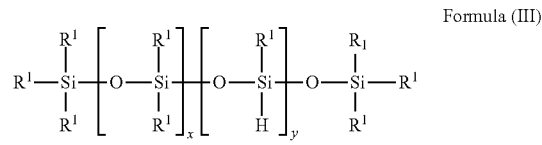

with $R^1$, identically or differently: alkyl and/or aralkyl and/or aromatic radical, each comprising 1 to 10 carbon atoms
with $0 \leq x \leq 250$ and
with $1 \leq y \leq 50$, Formula (IV)

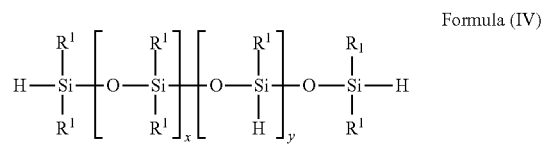

with $R^1$, identically or differently: alkyl and/or aralkyl and/or aromatic radical, each comprising 1 to 10 carbon atoms,
with $0 \leq x \leq 250$ and
$1 \leq y \leq 50$, Formula (V)

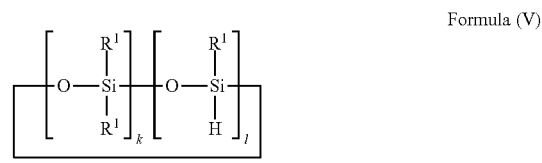

with $R^1$, identically or differently: alkyl and/or aralkyl and/or aromatic radical, each comprising 1 to 10 carbon atoms,
and with $4 \leq (k+1) \leq 5$ and
$1 \geq 1$.

5. The process according to claim 4, wherein the $R^1$ radical is a methyl group.

6. The process according to claim 1, wherein the olefinically unsaturated polyether conforms to the formula (VI):

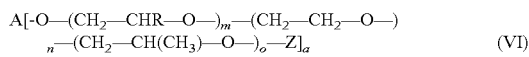

$$A[-O-(CH_2-CHR-O-)_m-(CH_2-CH_2-O-)_n-(CH_2-CH(CH_3)-O-)_o-Z]_a \quad (VI)$$

with A an olefinically unsaturated organic radical having at least two carbon atoms, of an organic starter compound for provision of the polyether and R independently a saturated alkyl group having 2-18 carbon atoms or an aromatic radical, and Z either hydrogen, a linear or branched, saturated or unsaturated hydrocarbyl radical having 1-18 carbon atoms, or m 0 up to 50, n 0 up to 250, o 0 up to 250, a 1 up to 8, wherein the sum total of m, n and o is not less than 1.

7. The process according to claim 1, wherein it is conducted in the presence of a precious metal catalyst selected from the group consisting of platinum complexes, rhodium complexes, osmium complexes, ruthenium complexes, palladium complexes, iridium complexes or the derivatives thereof that have been immobilized on support materials including silica, alumina or activated carbon, and solutions thereof.

8. The process according to claim 1, wherein it is conducted in the presence of a precious metal catalyst selected from complexes of zero-valent platinum and/or solutions thereof.

9. The process according to claim 1, wherein the amount of the precious metal catalyst used is 1 to 100 ppm by weight, based on the mass of the siloxane having SiH groups plus the mass of the olefinically unsaturated polyether.

10. The process according to claim 1, wherein the precious metal-catalysed addition of the olefinically unsaturated polyethers onto siloxanes having SiH groups is undertaken at temperatures between 0° C. and 200° C.

11. The process according to claim 1, wherein the siloxane having SiH groups is mixed together with a polyethersiloxane by stirring, and the preliminary mixture is contacted with an olefinically unsaturated polyether and with a precious metal catalyst and optionally further additives by further stirring.

12. The process according to claim 1, wherein the amount of the precious metal catalyst used is 2 to 10 ppm by weight, based on the mass of the siloxane having SiH groups plus the mass of the olefinically unsaturated polyether.

13. The process according to claim 1, wherein the precious metal-catalysed addition of the olefinically unsaturated polyethers onto siloxanes having SiH groups is undertaken at temperatures between 50° C. and 140° C.

14. The process according to claim 6, wherein the A in formula (VI) is an olefinically unsaturated organic radical having at least three carbon atoms, and R is an ethyl group or a phenyl radical, Z is selected from the group consisting of methyl, ethyl, propyl, butyl, vinyl, allyl or methallyl group, and m is from 0 to 30, n is from 3 to 220, o is from 3 to 220, and a is from 1 to 6.

15. The process according to claim 6, wherein the

Z is the radical of an organic acid of the formula $-C(=O)-Z_E$ where $Z_E$ is an organic radical, and m is from 0 to 20, n is from 5 to 200, o is from 5 to 200, and a is from 1 to 4.

16. The process according to claim 6, wherein $Z_E$ is a linear or branched, saturated or unsaturated hydrocarbyl radical having 1-17 carbon atoms.

17. The process according to claim 6, wherein $Z_E$ is selected from the group consisting of methyl group, or an aromatic hydrocarbyl radical having 6 to 20 carbon atoms.

18. The process according to claim 6, wherein $Z_E$ is a phenyl radical a linear or branched, saturated or unsaturated hydrocarbyl radical having 1-18 carbon atoms.

19. The process according to claim 6, wherein $Z_E$ is a radical of the formula $-C(=O)-O-Z_C$ where $Z_C$ is an organic radical.

20. The process according to claim 6, wherein $Z_E$ is a radical of the formula $-C(=O)-O-Z_C$ where $Z_C$ is a phenyl radical.

* * * * *